United States Patent

Marley

[15] 3,639,781

[45] Feb. 1, 1972

[54] SERIES GATED MULTIPLEXER CIRCUIT

[72] Inventor: Robert R. Marley, San Jose, Calif.

[73] Assignee: Fairchild Camera and Instrument Corporation, Mountain View, Calif.

[22] Filed: Oct. 26, 1970

[21] Appl. No.: 83,999

[52] U.S. Cl. ..............................307/243, 307/203, 328/104, 179/15 A, 330/30 D

[51] Int. Cl. ........................................H03k 19/00, H04j 3/00

[58] Field of Search ..................307/242, 243, 203; 328/104; 179/15 A, 15 BL, 18 R, 18 A, 18 F, 18 AA; 330/30 D

[56] References Cited

UNITED STATES PATENTS

| | | | |
|---|---|---|---|
| 3,213,290 | 10/1965 | Klein et al. | 328/104 X |
| 3,241,078 | 3/1966 | Jones | 330/30 D |
| 3,522,443 | 8/1970 | Kanter | 307/203 |
| 3,535,458 | 10/1970 | Gottfried | 179/15 A |
| 3,538,348 | 11/1970 | Hillis et al. | 330/30 D |
| 3,550,040 | 12/1970 | Sinusas | 307/242 |

*Primary Examiner*—John S. Heyman
*Attorney*—Roger S. Borovoy, Alan MacPherson and Charles L. Botsford

[57] ABSTRACT

A multiplexer of the series-gated-type wherein the minterms of two variables are generated in positive logic, each of these minterms being used to control one pair of four current path pairs in one level of the multiplexer, is described. Each of the paths in said four pairs of paths controls a separate one of eight inputs in another level of the series gated structure. The gate of another level selects one current path of said selected pair in said one level and thereby selects one of said inputs. A single current source supplies the current for the one-out-of-eight selected current path.

4 Claims, 5 Drawing Figures

INVENTOR
ROBERT R. MARLEY
BY Alan H. MacPherson
ATTORNEY

INVENTOR
ROBERT R. MARLEY
BY Alan H. MacPherson
ATTORNEY

SERIES GATED MULTIPLEXER CIRCUIT

BACKGROUND OF THE INVENTION

Several different approaches have been taken in the logic implementation of logic circuits such as multiplexer circuits, including the straight gate technique and the specialized function approach.

In the straight gate current mode logic (CML) case, a master chip is used which includes a relatively larger number of gates, and these gates may be interconnected by the circuit designer in any selected manner to obtain the desired function. This is a simple approach which bypasses detailed circuit design but it results in a relatively slow circuit with high-power requirements, since a number of individual current sources are required.

To obtain increased speed and reduce circuit power, specialized function IC multiplexers have been fabricated by careful custom design, resulting in the fewest number of gates organized in an efficient circuit layout. One such multiplexer is the CML series gated structure, an example being an 8 to 1 multiplexer wherein the X-, Y-, and Z-minterms are generated in three external gates, the eight minterms being utilized to control eight gates associated with the eight input data lines, one of which is selected. In series gating, a number of logic functions can be generated using a single current source.

In one known form of series gated 8 to 1 multiplexer, the circuit organization resulted in a two gate delay between the eight line select input terminals and the output. In addition the three level structure operates with more than one $V_{BE}$ drop per level, resulting in a complicated bias driver arrangement.

SUMMARY OF THE PRESENT INVENTION

The present invention provides a CML series gated logic circuit, for example, a multiplexer, organized such that only five internal gates and one external gate are utilized in forming a three level logic multiplexer. The output is fed from a three level logic structure, two of the three levels being driven in true and complementary fashion which results in tight packing on the series gated tree. The minterms of two variables are generated in positive logic using three current sources and these minterms are used to form a pair of four current paths gate structure, thus holding the number of logic levels needed to a minimum. The four wide level of logic has only one gate device turned on at any one time and requires only one current source.

The output circuit of the multiplexer employs temperature compensation to minimize saturation problems on the eight transistors driven from the eight inputs, thus providing extremely high-temperature operation.

DESCRIPTION OF A PREFERRED EMBODIMENT OF THE INVENTION

Figures 1, 2, 3:
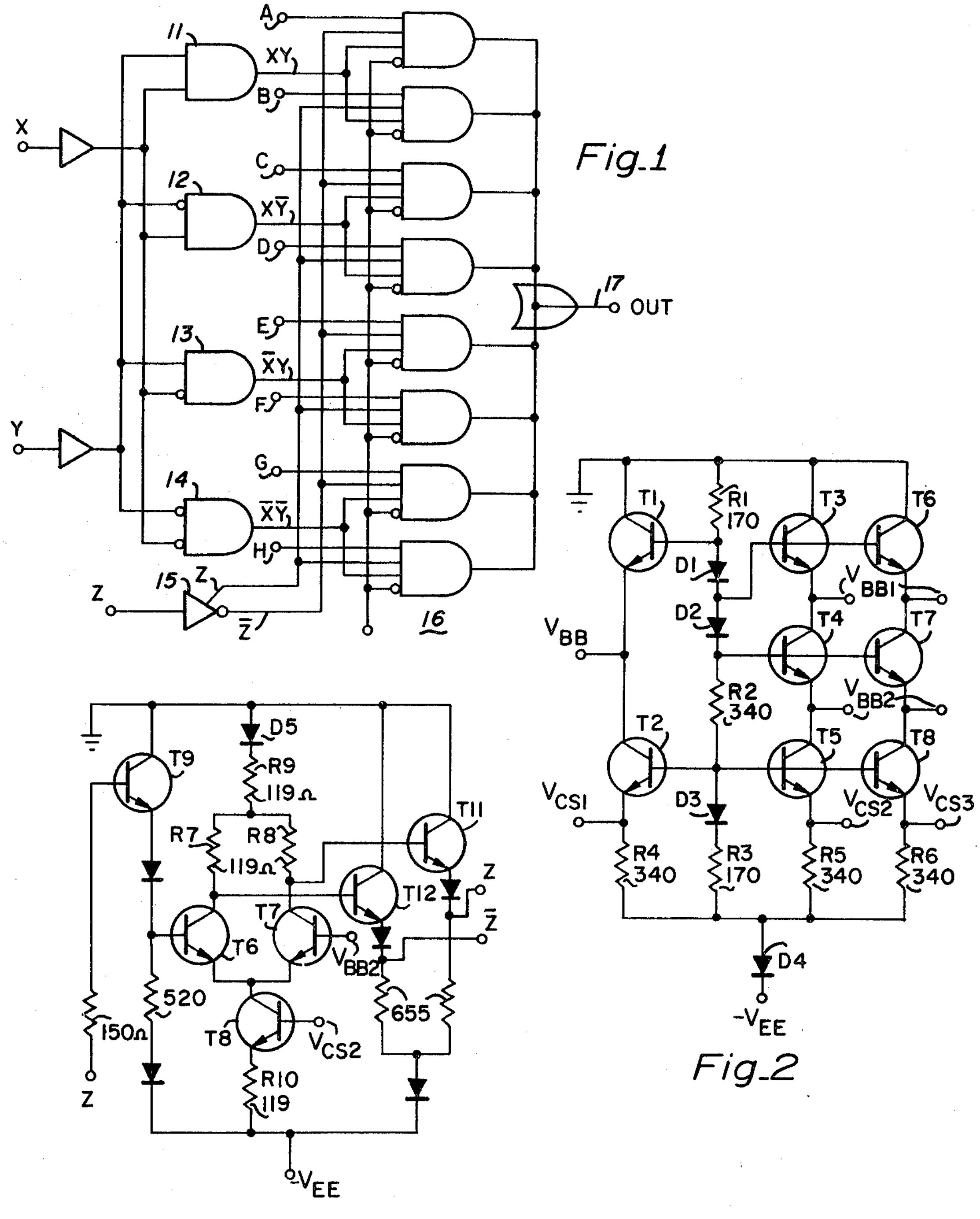
FIG. 1 is a block diagram of the multiplexer structure of the present invention.
FIG. 2 is a schematic diagram of an embodiment of the bias driver used in the multiplexer circuit.
FIG. 3 is a schematic diagram of one embodiment of the Z gate used in the multiplexer.

Referring now to FIG. 1, the four minterms XY, $X\overline{Y}$, $\overline{X}Y$ and $\overline{XY}$ are formed by the four gates 11, 12, 13 and 14, respectively, with the term Z being formed by the fifth gate 15. A gate structure 16 controlled by the Z term and the four XY-minterms selects one of the eight input data lines A to H, inclusive, for transmittal to the output 17. Each of the four XY-minterms selects two associated paths through the gate structure 16, while the fifth term Z selects one of the two paths, thus selecting one of the eight input lines A through H. This organization utilizes five internal gates 11–15 and one external gate structure 16 to accomplish the eight-to-one multiplexer. There is only a one gate delay, gate 16, between the input lines and the output, providing high-speed operation. As will be seen below, only one current source is needed for the series gated multiplexer tree, thereby minimizing the speed-power product for this multiplexer.

The bias network and driver for the multiplexer is shown in FIG. 2, this network operating as described in U.S. Pat. application Ser. No. 841,765 entitled, "Temperature Compensated Current-Mode Logic Circuit" filed on July 15, 1969 by Robert R. Marley to produce temperature-independent voltage levels. This network comprises resistors R1, R2 and R3 connected in series with diodes D1, D2, D3 and D4 across the bias supply voltage $V_{EE}$ which, in this embodiment, is –5.2 volts. The number associated with the resistor in the drawing is its resistance in ohms. This circuit produces base voltages for the transistors T1 and T2 in a first branch circuit including R4, for transistors T3, T4 and T5 in a second branch circuit including R5, and for transistors T6, T7 and T8 in the third branch circuit including R6.

Figure 4:
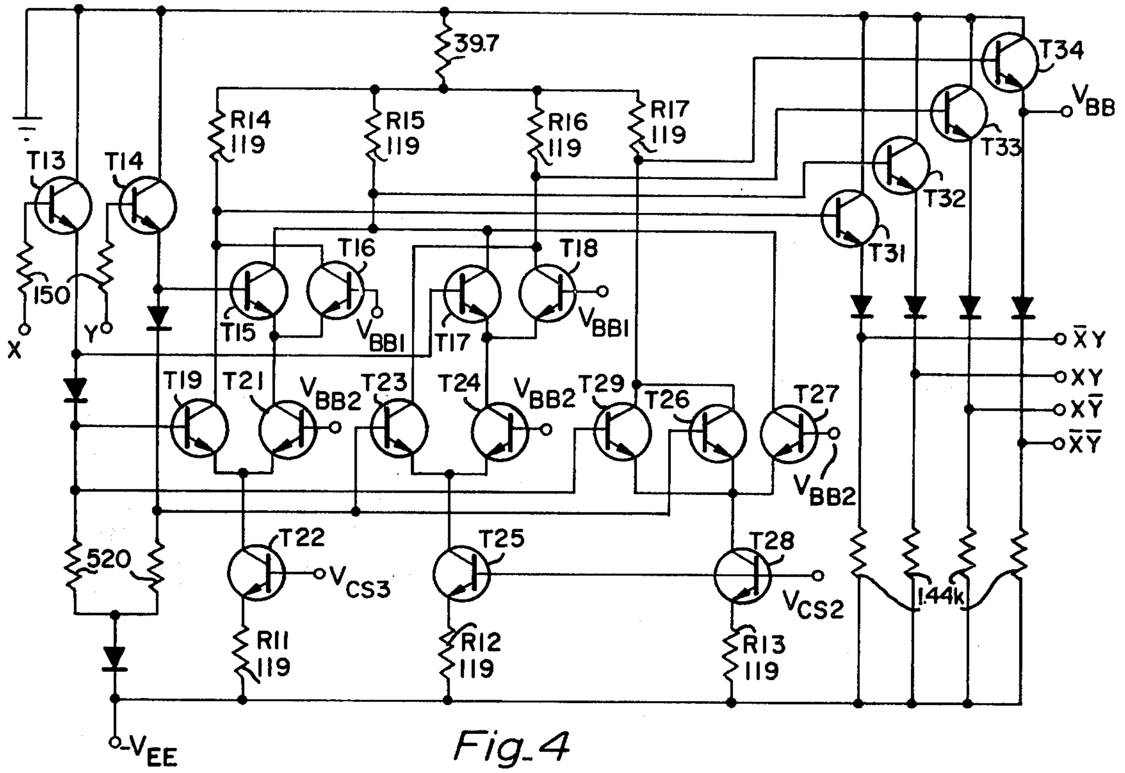
FIG. 4 is a schematic diagram of the X- and Y-minterm gate structure.
Figure 5:
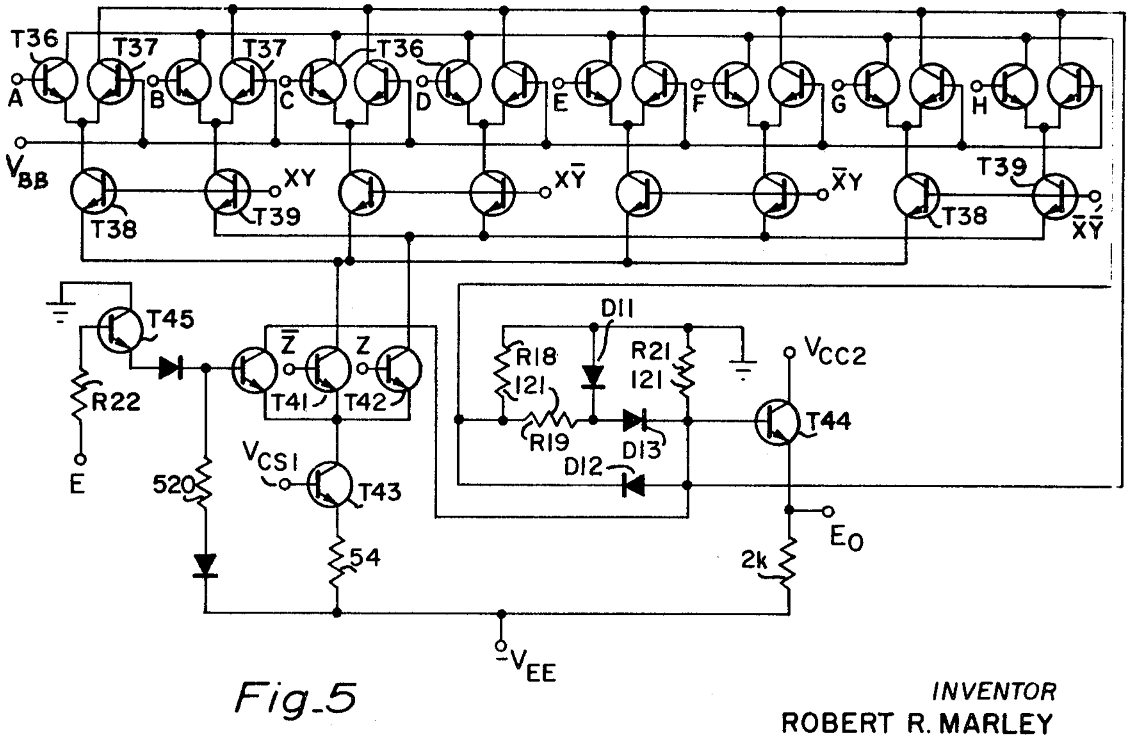
FIG. 5 is a schematic diagram of the three level multiplexer gate.

Temperature-independent current source voltages of $V_{CS1}$, $V_{CS2}$ and $V_{CS3}$ and the bias voltages $V_{BB}$, $V_{BB1}$ and $V_{BB2}$ are produced at the junctions shown in the drawing, these voltages being utilized in the circuits of FIGS. 3, 4 and 5 as indicated.

The $z$-gate of FIG. 3 comprises a current steering network including an input transistor T6 and its associated biasing resistor R7 in one branch, the other branch including a reference transistor T7 and its associated biasing resistor R8. The two branches are connected in series to resistor R9 and diode D5, the emitters of T6 and T7 being coupled in common to the current source circuit including transistor T8 and resistor R10 coupled to the supply voltage $V_{EE}$.

The input to the Z-gate is coupled via transistor T9 to the base of T6, the reference voltage $V_{BB2}$ being coupled to the base of the reference transistor T7. With a high on the base of T9, the base of T6 goes high, and current flows in the left-hand branch, turning T6 on and pulling the common emitter up. Transistor T7 is off, resulting in a high at the junction of R8 and T7, which causes output transistor T11 to produce a high on the noninverted output $z$.

The collector of T6 goes low causing T12 emitter to go low and produces a low at output $\bar{z}$. With a low on the base of T9, the current flow is through the right-hand branch and the junction of R7 and T6 is high, causing output transistor T12 to produce a high on the inverted output $\bar{z}$, while T11 produces a low on the noninverted output $z$ for use by the multiplexer circuit of FIG. 5.

The XY-minterm gate is shown in FIG. 4 and includes input circuits for the two X- and Y-inputs comprising the input transistors T13 and T14, respectively. A two level gate structure is provided, a first level including two current steering circuits comprising transistor T15 and its reference transistor T16 and the second transistor T17 and its associated reference transistor T18.

The second level comprises a first current steering circuit including transistor T19 and its associated reference transistor T21. The emitters of these two transistors are coupled in common to a current source including transistor T22 and resistor R11. The collector of T21 is coupled in common to the emitters of T15 and T16. A second current steering circuit comprises transistors T23 and T24 coupled to the second current source T25, R12. Another current steering circuit includes transistor T26 and its associated reference transistor T27 coupled in common to the third current source T28, R13. An additional transistor T29 is coupled in parallel with transistor T26.

A first current path comprising resistor R14 is coupled to the collectors of T16 and T19; a second current path including resistor R15 is coupled to the collectors of T15, T17 and T27; a third current path resistor R16 is coupled to the collectors of T18 and T23, and a fourth current path resistor R17 is coupled to the collectors of T26 and T29. The emitter of X-input transistor T13 is coupled to the base electrodes of T17, T19 and T29 while the emitter of Y-input transistor T14 is coupled to the base electrodes of T15, T23 and T26.

Output transistors T31, T32, T33 and T34 are coupled to the four current path resistors R14, R15, R16 and R17, respectively.

In operation, a high on the X-input will result in highs on the bases of T17, T19 and T29. A high on the Y-input will result in highs on the bases of T15, T23 and T26. Thus T15 and T17 in the first level will conduct, and T19, T23, T29 and T26 in the second level will all conduct. The reference transistors T16, T18, T21, T24 and T27 will all be nonconducting. A current path for R14 exists through T19, one for R16 exists through R23, and one for R17 exists through T26 and T29, and thus lows are produced on the bases of T31, T33 and T34.

No current path exists for R15 since T21, T24 and T27 are all off. A high therefore appears on the base of output transistor T32 which produces a high output at the associated XY-terminal.

With a high on the X-input to T13 and a low on the Y-input to T14, the transistors T17, T19 and T29 are rendered conducting and transistors T15, T23 and T26 rendered nonconducting. Reference transistors T16 and T24 are conducting and T27 held off by T29. Resistor R14 conducts through T19, resistor R15 conducts through T17 and T24, and resistor R17 conducts through T29. The current path through resistor R16 is blocked at T18 and T23, and a high is produced on the base of output transistor T33 which operates to place a high on the $X\bar{Y}$-terminal.

Thus, this XY-minterm gate operates to produce one of four outputs, depending on the inputs X and Y.

The multiplexer gate shown in FIG. 5 comprises a three level structure. The first level comprises the external gate structure 16 including eight current steering circuits, each including an input transistor T36 and a reference transistor T37, the base of each input transistor T36 being coupled to a different one of the eight input lines A through H, inclusive.

The second level comprises four pairs of current paths, each pair including transistors T38 and T39. The collector of each of the eight transistors in the second level is coupled to the emitters of a different one of the pairs of transistors T36, T37. The bases of each pair of transistors T38, T39 are coupled in common to an associated one of the four inputs XY, $\bar{X}Y$, $X\bar{Y}$ and $\bar{X}\bar{Y}$ from the minterm gate of FIG. 4. The drive to these four pairs of transistors is true and complimentary, e.g., with a high on input XY, the transistors T38 and T39 in the first pair both conduct, pulling their emitters up so as to maintain the corresponding transistors T38 and T39, respectively, in the other three pairs turned off. Thus, with any one pair of transistors T38, T39 on, the other three pairs are held off.

The third level comprises the Z-gate 15 including a pair of transistors T41 and T42 which have their emitters coupled in common to the current source transistor T43. The collector of T41 is coupled to the emitter of the four transistors T38 while the collector of T42 is coupled to the emitters of the four transistors T39. The base of T41 is connected to the inverted output and the base of T42 is connected to the noninverted output of the Z-gate of FIG. 3. The drive for this gate is true and complementary in that with the base of one high, it pulls the common emitters up and holds the other transistor off, and vice versa.

A current may be steered through any one of the eight pairs of transistors T36, T37 in the first level by energization of a selected one of the four pairs of transistors in the second level in combination with a selected one of the two transistors T41, T42. If the base of the input transistor T36 in the selected pair is high, then T36 turns on and a low is placed on the junction of R18 and R19 in the output network. This temperature independent output network is shown and described in U.S. Pat. application Ser. No. 29,967 entitled "Temperature Compensated Current Mode Logic Circuit" filed by Robert R. Marley et al., on Apr. 20, 1970. With a low on junction R18, R19, a current path exists through R18 in parallel with R19 and diode D11 in parallel with resistor R21 and diode D12, and the base of the noninverted output transistor T44 goes high to give a high output on $E_o$. With a low on the base of T36, the transistor T37 is turned on and a low appears at the junction of R21 and diode D13 and current flows through R18, R19 and diode D13, all in parallel with R21. The base of T44 goes low, to give a low output on $E_o$. Thus the high or low of the one selected input line A through H is reproduced at the output terminal $E_o$.

The multiplexer includes an enable circuit comprising the transistor T45 with its base connected through resistor R22 to the enable terminal E. If the input to T45 is high, it pulls the output at $E_o$ low to disable this multiplexer; a low on T45 permits $E_o$ to go high or low, depending on the input lines A through H. A plurality of these multiplexer circuits may be tied together with their outputs OR tied to give a one-of-sixteen select, for example.

Typically, in series gated structures, the bases of the reference transistors in a current steering circuit are coupled to a fixed bias voltage and the high and low voltage on the base of the associated input transistor of the current steering circuit swings above and below this fixed bias. An example of such a circuit is the current steering circuit in FIG. 4 including T15 and T16. Use of this form of circuit in the second and third levels of the multiplexer of FIG. 5 would result in a 2 $V_{BE}$ drop in each level of the structure between the level above and the level below, and thus would limit the number of levels that may be fitted within the power supply range, in this case 5.2 volts, to two levels instead of three.

In the present invention, the bases of T38 and T39 are tied together in each of the four pairs of current paths in the second level, so that both paths in a single pair controlled by a particular one of the four minterms XY, $\bar{X}Y$, $X\bar{Y}$ and $\bar{X}\bar{Y}$ will be turned on. Only one of the four pairs will be turned on at any one time since the on condition of each transistor in the conducting pair pulls up the potential on the emitters of the other three transistors tied in common, and thus maintains the other three pairs of transistors in the off condition. These paths of the two conducting transistors are controlled from the two Z-term transistors T41, T42, the inputs to the bases of these Z-term transistors being true and complementary in that one is high and the other low at any one point in time and the conducting transistor holds the other off. Because of the true and complementary fashion of operation of these two levels, only one $V_{BE}$ drop occurs at each of the second and third levels; thus all three levels in this multiplexer are easily accommodated within the power supply range of 5.2 volts.

In addition, this organization permits each level to be more complex, i.e., to incorporate more logic, than the example shown in the drawings. For example, the second level could be controlled by eight minterms developed from three variables, XYM, in an eight output minterm gate, instead of the two variables X and Y shown. Each minterm would control one pair of transistors T38, T39 out of eight pairs, the conducting transistors in each pair holding the associated transistors in the other seven transistor pairs off as explained above. The third level could be expanded in similar manner. Thus, a one-of-sixteen multiplexer could be obtained having three levels and one current source.

Note also that only one current source (T43) is used to supply the selected one-of-eight current paths and that there is only a one gate delay between the input lines A–H and the output terminal $E_o$.

What is claimed is:

1. A logic circuit for transmitting the data on any one of eight inputs to an output circuit comprising
   a current source,
   a first pair of current paths comprising a pair of transistors, each having an emitter, a collector, and a base, said emitters being coupled to said current source,
   a first term gate for producing two outputs from one variable input, each of said outputs of said term gate being coupled to the base of a different one of the transistors in said first pair of current paths, a plurality, *n*, of pairs of current paths, each pair comprising a pair of transistors, each transistor having an emitter, a collector, and a base, the emitters of one of said transistors in each of said *n* pairs being coupled in common to the collector of one transistor in said first pair of current paths, the emitters of the other of said transistors in each of said *n* pairs being coupled in common to the collector of the other transistor in said first pair of current paths, a plurality, *n*, of minterm gates for producing *n* outputs for a lesser plurality of variable inputs, each of the outputs of said *n* minterm gates being coupled in common to the bases of a different one of the pairs of transistors in said *n* pairs of current paths, an external gate structure comprising **2*n*** pairs of transistors, each transistor having an emitter, a collector, and a base, the emitters of each pair being coupled in common to the collector of a different one of the transistors in said *n* pairs of current paths, a bias network for providing a reference voltage to the base of one transistor in each of said **2*n*** pairs of transistors in said external gate structure,

**2*n* inputs, the base of the second transistor in each of said 2*n* pairs of transistors being coupled to a separate one of said 2*n*** inputs, and an output circuit, the collectors of each pair of transistors in the external gate structure being coupled to said output circuit.

2. A logic circuit as claimed in claim 1 wherein *n* is four.

3. A logic circuit comprising at least two levels of logic one level comprising a pair of transistors, each having a collector, an emitter and a base, said emitters being coupled in common to a current source, an input connected to each base, either of said transistors, when turned on, holding the other transistor off, the second level comprising a plurality of pairs of transistors, the emitters of the first transistor in each pair coupled in common to the collector of one of the transistors in said first level, the emitters of the second transistor in each pair coupled in common to the collector of the other transistor in said first level, the bases of each transistor in a pair of transistors in the second level being coupled together to separate ones of a plurality of inputs, either of the transistors in a pair, when turned on, holding the other transistors in the other pairs emitter-coupled thereto turned off, and a further logic level coupled to the collectors of the transistors in said second level.

4. A logic circuit as claimed in claim 3 wherein said second level comprises four pairs of transistors.

* * * * *